United States Patent [19]

Ehm et al.

[11] Patent Number: 4,805,265

[45] Date of Patent: Feb. 21, 1989

[54] HINGE FOR FASTENING SWIVELABLY ARRANGED ELECTROTECHNICAL APPLIANCES

[75] Inventors: Thomas Ehm, Dortmund; Peter Seidel, Groebenzell, both of Fed. Rep. of Germany

[73] Assignee: Siemens Aktiengesellschaft, Berlin and Munich, Fed. Rep. of Germany

[21] Appl. No.: 82,087

[22] Filed: Aug. 5, 1987

[30] Foreign Application Priority Data

Sep. 25, 1986 [DE] Fed. Rep. of Germany ....... 3632644

[51] Int. Cl.4 ............................................. E05D 3/04
[52] U.S. Cl. ........................................ 16/340; 16/247
[58] Field of Search ................ 16/261, 262, 263, 266, 16/340, 247, 337, 341, 342, 381, DIG. 42

[56] References Cited

U.S. PATENT DOCUMENTS

| | | | |
|---|---|---|---|
| 1,818,182 | 8/1931 | Woernle | 16/340 |
| 2,939,168 | 6/1960 | Ferron | 16/340 |
| 3,052,497 | 9/1962 | Lohr | 16/341 |
| 3,991,436 | 11/1976 | Nagase | 16/247 |
| 4,428,094 | 1/1984 | Emain | 16/342 |

Primary Examiner—M. Jordan
Attorney, Agent, or Firm—Hill, Van Santen, Steadman & Simpson

[57] ABSTRACT

A hinge which provides for a simple and fast assembly or dismantling and for an automated assembly and for use with assumed planarly fashioned hinge pin receptacles which proceed parallel to one another. A region of the hinge is fashioned as an ondular washer or Belleville spring washer in a hinge spring which is inserted between the hinge pin receptacles. The hinge spring is bent arcuately back onto itself over the edge of one of the hinge pin receptacle and is fashioned with catch elements such that these engage into an annular groove of a hinge pin introduced into the aligning bores of the hinge pin receptacles and of the ondular washer or, respectively, Belleville spring washer region.

16 Claims, 1 Drawing Sheet

HINGE FOR FASTENING SWIVELABLY ARRANGED ELECTROTECHNICAL APPLIANCES

BACKGROUND OF THE INVENTION

This invention is directed to a hinge for fastening swivelably arranged electronic appliances and has two planar hinge pin receptacles arranged parallel relative to one another and has a bore arranged in every hinge pin receptacle and corresponding to the thickness of the hinge pin such that a hinge pin, outwardly shaped step-like at an end, can be introduced perpendicular to the hinge pin receptacle regions proceeding parallel, being introduced thereinto beginning with the hinge pin end lying opposite the end shaped step-like.

Hinges for fastening swivelably arranged parts, for example for fastening swivel frames that accept electronic assemblies in a cabinet rack or a wall mount, are known in the prior art wherein a cylindrical hinge pin, outwardly shaped step-like at one end, is arranged in bores of hinge pin receptacles connected to swivelably arranged appliances. The hinge pin is held by a threaded screw which is screwed against the opposite hinge pin end outwardly shaped step-like and provided with a corresponding thread. In the hinge region, the two planarly fashioned hinge pin receptacles have approximately the same material thickness and are arranged parallel to one another. A spring washer can be inserted into the hinge fastening for stability reasons. These hinges can be mounted at fastening locations that are difficult to access, for example at a swivel frame wall mount fastening, only with considerable time, expense and expertise. An automated mounting or assembly of this hinge is made very difficult due to the complicated mounting or assembly sequence.

SUMMARY OF THE INVENTION

An object of the present invention is to provide a hinge for swivelably arranged electronic appliances whose mounting and dismantling is simple and fast to execute especially for automated mounting, as well as, dismantling. This is especially advantageous for hinge fastening locations that are difficult to access.

The advantage obtainable with the present invention is effected in that this hinge includes a favorable arrangement of a spring between the hinge pin receptacles which enhances the mechanical stability of the hinge.

The advantageous improvements of the present invention are each based on a hinge pin fashioned bipartitely which further facilitates the dismantling of the hinge. The advantage obtainable with these improvements is particularly achieved in the fixing of the lower part of the hinge pin and of the hinge pin spring to a hinge pin receptacle after the dismantling of the hinge, thereby capturing the hinge pin and spring in the receptacle.

Further advantageous developments of the present invention are provided in specific embodiments of the hinge spring with which an extremely simple and fast dismantling, such as by pressing the spring ends apart, for example with a screwdriver, are provided in addition to the simple mounting and assembly of the hinge.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, in the several Figures in which like reference numerals identify like elements, and, in which:

DESCRIPTION OF THE PREFERRED EMBODIMENT

Figure 1:
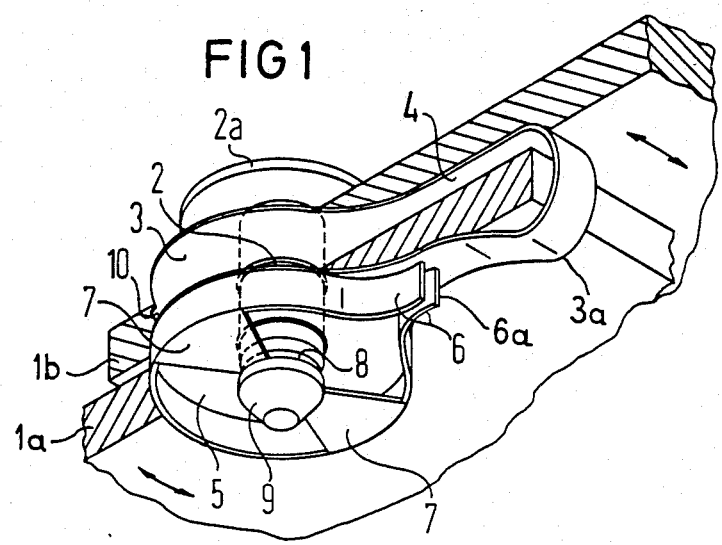
FIG. 1, is a perspective view of an embodiment of the present invention showing a single-piece hinge pin and a hinge spring for fast dismantling.

FIG. 1 shows two hinge pin receptacles 1a and 1b arranged in parallel and each having approximately a constant thickness which are respectively connected to a pivotably arranged appliance (not shown), for example a swivel frame holding electronic assemblies and a corresponding wall mount. The swivel direction is identified by the two quarter-circle lines on the surfaces of the hinge pin receptacles 1a and 1b provided with arrows at both sides. Both hinge pin receptacles 1a and 1b have a bore such that a cylindrical hinge pin 2 introduced into these bores is arranged approximately perpendicularly relative to the hinge pin receptacles 1a and 1b. At one end, the hinge pin 2 comprises a cylindrical hinge pin region 2a outwardly shaped step-like, whereby the surface of this hinge pin region 2a is directed toward the hinge pin receptacle 1b and presses flush against the hinge pin receptacle 1b. A hinge spring 4 fashioned as a cylindrical ondular washer region 3 (such as a Belleville spring washer) is inserted in the hinge pin region 2a between the two hinge pin receptacles 1a and 1b. This ondular washer region 3 comprises a correspondingly large bore for the passage of the hinge pin 2. The ondular washer region 3 of the hinge spring 4 merges into a hinge spring region 3a fashioned strip-like which extends in the direction of the hinge pin receptacle 1a lying opposite the hinge pin region 2a outwardly shaped step-like.

This region 3a of the hinge spring 4 fashioned strip-like is arcuately bent back onto itself over the edge of the hinge pin receptacle 1a in the direction of the hinge pin 2 and merges into a circular hinge spring region 5 fashioned around the hinge pin 2 and proceeding parallel to the hinge pin receptacle 1a, whereby the center of this hinge spring region 5 has a bore for the passage of the hinge pin 2. The edge region of the circular hinge spring region 5 lying opposite the hinge spring region 3a fashioned strip-like merges into a further hinge spring region 6 fashioned strip-like perpendicular to the hinge pin receptacle 1 and following the circular edge contour of the circular hinge spring region 5. The ends of this hinge spring region 6 are bent back onto themselves such that the end regions 6a run out lying parallel relative to one another.

A catch spring 7 respectively proceeding perpendicular to the hinge pin direction and respectively directed toward the hinge pin 2 is arranged between the fastening and the two ends of this hinge spring region 6 fashioned strip-like. The respective end of the catch springs 7 pointing toward the hinge pin 2 and adapted to the hinge pin 2 curvature lies flush in an annular groove 8 arranged in the hinge pin 2 at an appropriate distance from the hinge pin receptacle 1a. A hinge pin end 9, lying opposite the hinge pin region 2a outwardly shaped step-like, is conically fashioned in order to facilitate the introduction of the hinge pin 2 into the hinge pin receptacles 1a and 1b and into the hinge spring 4.

The assembly of the hinge begins with the insertion of a hinge pin receptacle 1a between the ondular washer region 3 and the circularly fashioned hinge spring region 5 of the hinge spring 4. In order to facilitate this insertion of the hinge spring 4, that edge of the ondular washer region 2 lying opposite the hinge spring region 3a fashioned strip-like comprises a guide table 10 proceeding approximately parallel to the hinge pin receptacle 1a and projecting beyond the circularly fashioned hinge spring region 5. Subsequently, the bore of the second hinge pin receptacle 1b is brought over the first hinge pin receptacle 1a provided with hinge spring 4 such that all bores of the hinge pin receptacles 1a and 1b and of the hinge spring 4 lie above one another. The hinge pin 2 can then be introduced up to the hinge pin region 2a outwardly shaped step-like. The ondular washer region 3 of the hinge spring 4 is compressed and, thus, an engagement of the catch springs 7 into the annular groove 8 of the hinge pin 2 is enabled by pressure on the hinge pin 2 and counter-pressure on the hinge spring region 6 provided with the latch elements 7. The dismantling of the hinge ensues by pressing the two ends of the circularly bent hinge spring end regions 6a apart, whereby the catch springs 7 are lifted out of the annular groove 8 of the hinge pin 2 and the hinge pin 2 can be removed.

Figure 2:
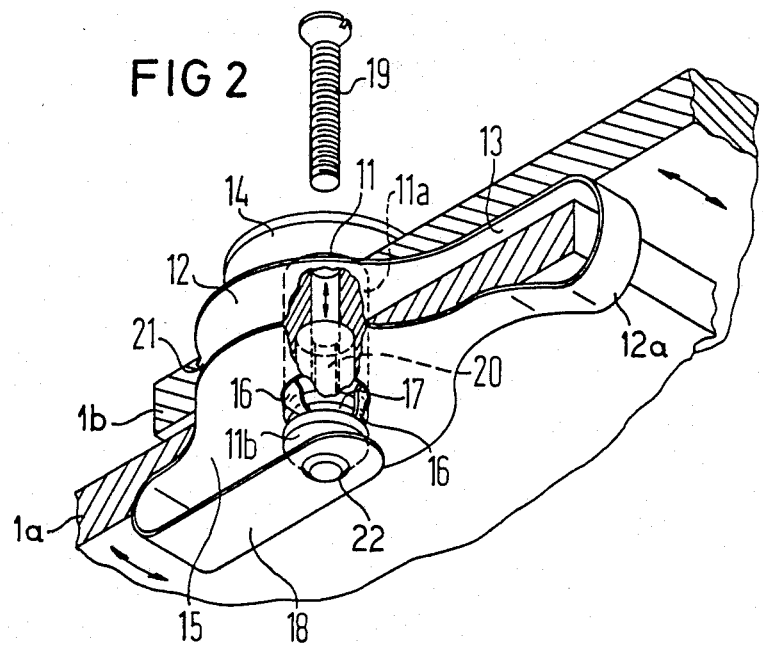
FIG. 2 is a perspective view of an embodiment of the present invention showing a bipartite hinge pin and a "captive" lower hinge pin part and hinge spring.

FIG. 2 likewise shows the hinge pin receptacles 1a and 1b arranged in the same fashion and provided with bores. Likewise, as in FIG. 1, an ondular washer region 12 of a hinge spring 13 is inserted between the hinge pin receptacles 1a and 1b. The ondular washer region 12 is provided with a bore for the passage of a hinge pin 11. At one end, the hinge pin 11 likewise comprises a hinge pin region 14 outwardly shaped step-like. The circularly fashioned ondular washer region 12 again merges into a hinge spring region 12a fashioned strip-like, merging thereinto in the direction of a hinge pin receptacle edge. This hinge spring region 12a fashioned strip-like is in turn bent back onto itself over the edge of the hinge pin receptacle 1a in the direction of the hinge pin 11.

According to FIG. 2, the hinge spring 13 in this region of the hinge pin 11 merges into a hinge spring region 15 circularly fashioned around the hinge pin 11. This circularly fashioned hinge spring region 15 in turn has a bore for the passage of the hinge pin 11. A plurality of catch springs 16 are fashioned at the edge of this bore, these catch springs 16 beginning in an axial direction from the edge of the bore, proceeding arcuately in the direction of the hinge pin 11 and ending approximately perpendicular to the hinge pin direction. The ends of the catch springs 16 pointing toward the hinge pin 11 lie approximately flush in an annular groove 17 of the hinge pin 11 arranged at an appropriate distance from the hinge pin receptacle 1a. An end 22 of the hinge pin 11 lying opposite the hinge pin end 14 outwardly shaped step-like is conically fashioned. This conical hinge pin end 22 engages into a correspondingly arranged bore of a hinge spring end region 18 continued strip-like and bent arcuately back onto itself in the direction of the hinge pin 11.

The hinge pin 11 is fashioned of two parts, an upper hinge pin part 11a and of a lower hinge pin part 11b. The upper hinge pin part 11a encompasses the hinge pin 11 beginning with the upper edge of the annular groove 16, and ending with the hinge pin region 14 outwardly shaped step-like and has a bore in its axial middle for the passage of a threaded screw 19. The lower hinge pin part 11b extends from the upper edge of the annular groove 16 to the end of the conical hinge pin end 22 and has a blind threaded bore 20 in an axial direction which corresponds to the thread of the threaded screw 19 and beginning opposite the conical hinge pin end 22.

Before the assembly of the hinge, the threaded screw 19 is introduced into the bore of the upper hinge pin part 11a and is subsequently turned into the threaded bore 20 of the lower hinge pin part 11b, whereby the hinge pin 11 assembled in this way is prepared for further assembly, for example automated assembly. The assembly of the spring 13 is carried out as described in FIG. 1. However, the counter-pressure with whose assistance the engagement of the catch springs 16 into the annular groove 17 of the hinge pin 11 is enabled, is exerted on the hinge spring region 15 circularly fashioned around the hinge pin 11. A guide tab 21 shaped according to FIG. 1 is likewise fashioned at the hinge spring 13 in order to facilitate the introduction of a hinge pin receptacle 1a into the hinge spring 13.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A hinge for fastening swivelably arranged electronic appliances having two planar hinge pin receptacles proceeding parallel to one another and having a bore arranged in each hinge pin receptacle and corresponding to the thickness of a hinge pin, the hinge pin having a region outwardly shaped step-like at one end, the hinge pin being introduced perpendicular to the hinge pin receptacles proceeding parallel to one another, the hinge pin being introduced beginning with the opposite hinge pin end from the region outwardly shaped step-like, comprising:
   an ondular washer region of a hinge spring, said ondular washer region proceeding largely parallel to the hinge pin receptacles and equipped with a bore at least having a diameter corresponding to the hinge pin thickness and inserted between the hinge pin receptacles; and
   a cooperating hinge spring region attached at the edge of the ondular washer region and bent arcuately back onto itself over an edge of one of the hinge pin receptacles, said hinge spring fashioned such that resilient catch elements, arranged in a hinge pin region of the cooperating hinge spring region, engaged into an annular groove located in the hinge pin.

2. The hinge according to claim 1 wherein the hinge pin is fashioned of an upper hinge pin part encompassing the region outwardly shaped step-like of the hinge pin and, beginning with the edge of the annular groove pointing toward said region outwardly step-like; and of a lower hinge pin part provided with a threaded bore proceeding in an axial direction, the hinge pin being formed with a threaded screw introduced into an axial bore of the upper hinge pin part and turned into the threaded bore of the lower hinge pin part.

3. The hinge according to claim 2 wherein the cooperating hinge spring region is continued beyond the hinge pin region provided with catch elements and is bent arcuately back onto itself such that, given an inserted hinge pin, a hinge spring end region presses against an end region of the hinge pin resiliently and proceeding parallel to the hinge pin receptacles.

4. The hinge according to claim 2 wherein an end of the cooperating hinge spring in the hinge pin region is fashioned as a region proceeding parallel to the hinge pin receptacles and provided with a bore for the passage of the hinge pin and the catch elements are fashioned in the region of the edge of the bore such that these catch elements engage into the annular groove of the hinge pin at the end of the insertion operation of the hinge pin.

5. The hinge according to claim 2 wherein the catch elements are formed by at least one catch element beginning at the edge of the bore, proceeding arcuately in an axial direction in the direction toward the hinge pin, and ending approximately perpendicular to the hinge pin direction.

6. The hinge according to claim 1 wherein an end of the cooperating hinge spring in the hinge pin region proceeds parallel to the hinge pin receptacles and is provided with a bore for the passage of the hinge pin and also has two walls extending parallel to the hinge pin and are fashioned at edges of this end of the cooperating hinge spring region in the hinge pin region and lying laterally opposed; and catch elements proceeding approximately parallel to the hinge pin receptacle, arranged at the walls, such that these catch elements engage into the annular groove of the hinge pin.

7. The hinge according to claim 6 wherein the catch elements are fashioned as catch springs and are shaped in accord with the hinge pin shape at their edges directed toward the hinge pin.

8. The hinge according to claim 1 wherein contacting surfaces of the hinge with the hinge pin receptacles are each provided with an electrically conductive layer to provide a grouned potential layer connection.

9. A hinge for fastening swivelably arranged electronic appliances having two planar hinge pin receptacles proceeding parallel to one another and having a bore arranged in each hinge pin receptacle and corresponding to the thickness of a hinge pin, the hinge pin having a region outwardly shaped step-like at a first end, the hinge pin being introduced perpendicular to the hinge pin receptacles proceeding parallel to one another, the hinge pin being introduced beginning with an opposite second hinge pin end from the region outwardly shaped step-like, comprising:

an ondular washer region of a hinge spring proceeding substantially parallel to the hinge pin receptacles and having a bore with a diameter substantially corresponding to the hinge pin diameter, the ondular washer region inserted between the hinge pin receptacles;

a first strip-like hinge spring region having first and second ends, the first end attached to an edge of the ondular washer region and bent arcuately back onto itself over an edge of one of the hinge pin receptacles;

a second hinge spring region attached to the second end of the first strip-like hinge spring region and located on an opposed side of the hinge pin receptacle from the ondular washer region, the second hinge spring region having a bore with a diameter substantially corresponding to the hinge pin diameter;

resilient catch springs attached to said second hinge spring region engaging into an annular groove located on an end of the hinge pin opposite the hinge pin region outwardly shaped step-like, the hinge extending through the bores of the two hinge pin receptacles, the second hinge spring region and the ondular washer region.

10. The hinge according to claim 9 wherein the hinge pin comprises an upper hinge pin part attached to the region outwardly shaped step-like of the hinge pin and extending to the edge of the annular groove; and a lower hinge pin part provided with a threaded bore proceeding in an axial direction, the hinge pin also having a threaded screw introduced into an axial bore of the upper hinge pin part and turned into the threaded bore of the lower hinge pin part.

11. The hinge according to claim 10 wherein the hinge further comprises a hinge spring end region extending from the second hinge spring region and bent arcuately back onto itself such that, given an inserted hinge pin, the hinge spring end region pressing against the second end of the hinge pin resiliently and proceeding parallel to the hinge pin receptacles.

12. The hinge according to claim 10 wherein the catch elements are fashioned in the region of the end of the bore in the second hinge spring region such that the catch elements engage into the annular groove of the hinge pin at the second end of the hinge pin.

13. The hinge according to claim 12 wherein the catch elements are formed by at least one catch element beginning at the edge of the bore, proceeding arcuately in an axial direction in the direction toward the hinge pin, and ending approximately perpendicular to the hinge pin direction.

14. The hinge according to claim 9 wherein the hinge further comprises two walls extending parallel to the hinge pin and attached at edges of the second hinge spring region and lying laterally opposed and having ends extending parallel a predetermined distance from the second hinge spring region; and catch elements proceeding approximately parallel to the hinge pin receptacle, arranged at the walls, such that these catch elements engage into the annular groove of the hinge pin.

15. The hinge according to claim 14 wherein the catch elements are fashioned as catch springs and are shaped in accord with the hinge pin shaped at their edges directed toward the hinge pin.

16. The hinge according to claim 9 wherein contacting surfaces of the hinge with the hinge pin receptacles are each provided with an electrically conductive layer to provide a grounded potential layer connection.

* * * * *